UNITED STATES PATENT OFFICE.

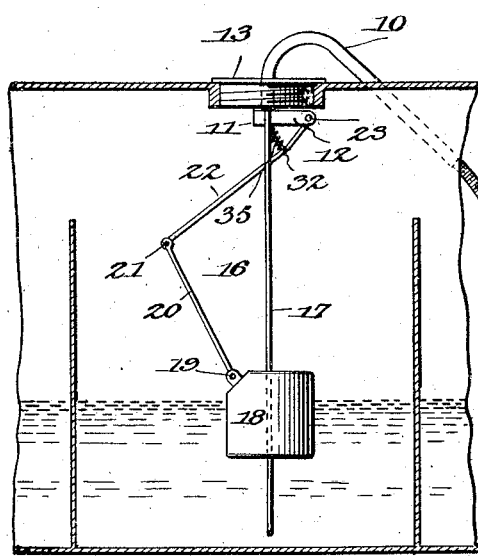
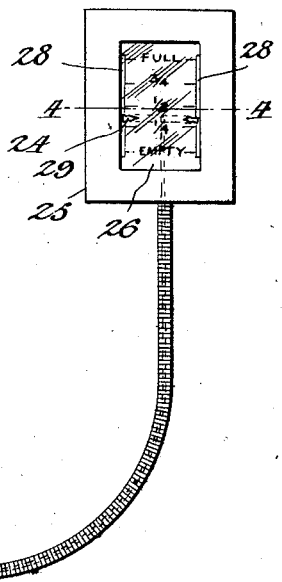
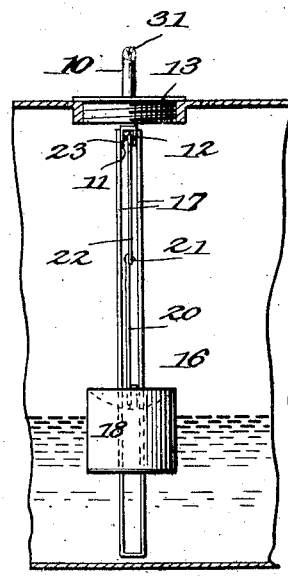
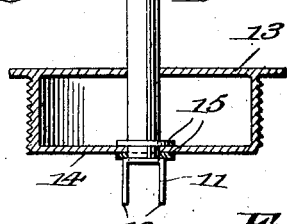
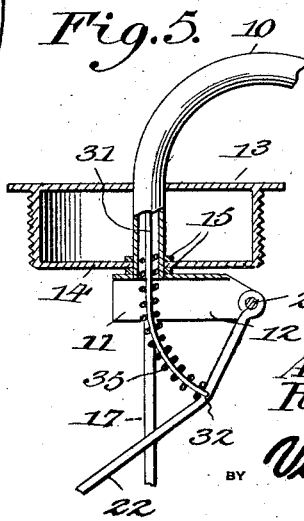

AUGUSTUS W. JONES AND ROBERT KAISER, OF ROCKVILLE CENTER, NEW YORK.

LIQUID-GAGE.

1,363,982. Specification of Letters Patent. Patented Dec. 28, 1920.

Application filed February 7, 1920. Serial No. 356,829.

*To all whom it may concern:*

Be it known that we, AUGUSTUS W. JONES and ROBERT KAISER, citizens of the United States, residing at Rockville Center, in the county of Nassau and State of New York, have invented new and useful Improvements in Liquid-Gages, of which the following is a specification.

This invention relates to liquid gages.

Some of the objects of the invention are: to produce a device of the character mentioned which is complete in itself and which will be readily applicable for use; to produce a device as characterized which is comparatively more practical and which is thoroughly efficient and reliably effectual in use; to provide a device which embodies an inclosed actuating flexible element which is arranged between an indicating means and a float mechanism, and a novel and simple means for permitting the proper operation of said actuating flexible element by preventing the buckling thereof and eliminating lost motion and to thus obtain accuracy as one of the features of this device; to produce a device which is complete in itself and which embodies a tank filling cap which is operatively connected or correlated with a particular part of the device which part supports the float mechanism intended for arrangement within a tank containing the liquid to be gaged. With these and other objects in view the invention resides in the particular provision and arrangement of parts hereinafter more fully described and illustrated in the accompanying drawings, in which:—

Figure 1 is a view illustrating the invention and its application to use.

Fig. 2 is a side elevation of the float mechanism and the parts correlated therewith.

Fig. 3 is a detail view illustrating the manner in which the filling cap is turnably related with a part of the device.

Fig. 4 is a transverse sectional view taken through the indicator and the line 4—4 of Fig. 1.

Fig. 5 is an enlarged detail view of the means for preventing the buckling of the actuating element.

One of the uses to which this invention may be put is to gage the quantity of gasolene within the supply tank of an automobile and wherein the indicator forming a part of the device will be arranged upon the instrument board of the automobile. It is to be understood however, that this device may be put to other uses. This device is particularly useful upon automobiles and devices can be made complete to include tank filling caps of different and special sizes to fit to different and special tanks so as to be readily applicable for use and without requiring expensive alterations and changes to parts to which it is applied. The float mechanism forming a part of the device will be correlated with the filling cap and the disposition of the float mechanism within the tank containing the gasolene without being affected by such things as baffle plates within the tank.

Referring now to the drawing, it will be seen, that the device consists of a curved tubular member 10 which has secured thereto a bracket 11 which consists of spaced plates 12. Turnably related with the member 10 is a tank filling cap 13. This cap has the bottom plate 14 thereof disposed between suitable washers 15 which are secured to the end of the tubular member 10 at its point of connection with the bracket 11. This filling cap is provided with the usual threaded flange and is made of a standard size to fit the filling opening of a standard size tank. The float mechanism 16 is supported by the bracket 11 and consists of spaced guide members 17 which are provided from a single piece of material. The guide members are attached to the plates 12 of the bracket 11. A float 18 is arranged for movement on the guide members 17 and this float has pivotally connected thereto, as at 19, an arm 20, which has jointed connection, as at 21, to an arm 22, which is pivoted as at 23, between the plates 12 of the bracket 11.

Indicating means 24 are provided which are actuated through the rise and fall of the float 18 through the intervention of an actuating flexible element between the arm 22 and an indicator forming a part of the indicating means. The indicating means 24 consists of a case 25 which is so constructed as to properly support a sight panel 26 which is disposed in front of the indicia plate 27. This plate 27 is provided with elongated slots 28 in which the pointers 29 carried by the pointer bar 30 move. The indicia plate 27 embodies certain intelligent matter with respect to which the pointers 29 move to denote the quantity of gasolene within the supply tank. An actuating flexible member in the nature of fine steel wire 31 has one end thereof connected to the arm 22, as at 32, and the opposite end thereof is connected to the pointer bar 30 as at 33. This wire 31 is inclosed by a close wound flexible tubular member 34 one end thereof being connected to the end of the tubular member 10 and the opposite end thereof is connected to the case 25. A convolute member 35 is secured to the arm 22 and encircles the end of the wire 31 attached to the arm 22 to prevent buckling of the wire 31 as the arm 22 moves to and fro to thus eliminate lost motion and giving to the device highest degree of accuracy as a gage.

From the foregoing it will also be manifest that the indicating means is of simple construction and one easy to read because of the plurality of indicating points; that the arrangement of the jointed levers of the float mechanism is such that at no time will they assume positions to prevent the upward movement of the float, but on the contrary, the float will be readily movable at all times, being easily started, since the guide members 17, as joined at the bottom, limit the downward movement of the float; that the tank filling cap is turnably correlated with parts of the device to permit the complete device to be readily assembled and to remain in a set position while the cap is being screwed in place; that only a small opening is required in the dash or instrument board as the case may be for the indicating means.

What is claimed as new is:—

1. A liquid gage comprising, means responsive to the rise and fall of tanked liquid, a tank filling and closure cap turnably related to said means and adapted to support said means so that the said means may be disposed within the tank containing the liquid, and indicating means operable by the first mentioned means and adapted to be arranged at a point remote from said first mentioned means.

2. A liquid gage comprising, indicating means, means including a tubular member, a bracket secured to said member, float mechanism suspended from said bracket, which mechanism is responsive to rise and fall of liquid, an inclosed flexible element operatively connected between the indicating means and said float mechanism, and a tank filling cap turnably connected to said tubular member.

3. A liquid gage comprising, indicating means, means including a curved tubular member, a tank filling cap turnably connected to said member, float mechanism supported by said member including jointed arms, one of which arms is pivotally mounted, a convolute member secured to the pivoted arm, and an inclosed flexible element operatively correlated with the indicating means and the float mechanism, the said element having an end thereof extending through said convolute member and secured to said pivoted arm.

4. A liquid gage comprising, indicating means, means including a curved tubular member, a tank filling cap turnably connected to said member, float mechanism supported by said member including jointed arms, one of which arms is pivotally mounted, a curved convolute member secured to the pivoted arm, and an inclosed flexible element operatively correlated with the indicating means and the float mechanism, the said element having an end thereof extending through said convolute member and secured to said pivoted arm, the said curved convolute member being disposed so as to have the free end thereof move in said tubular member.

In testimony whereof we have affixed our signatures.

AUGUSTUS W. JONES.
ROBERT KAISER.